UNITED STATES PATENT OFFICE.

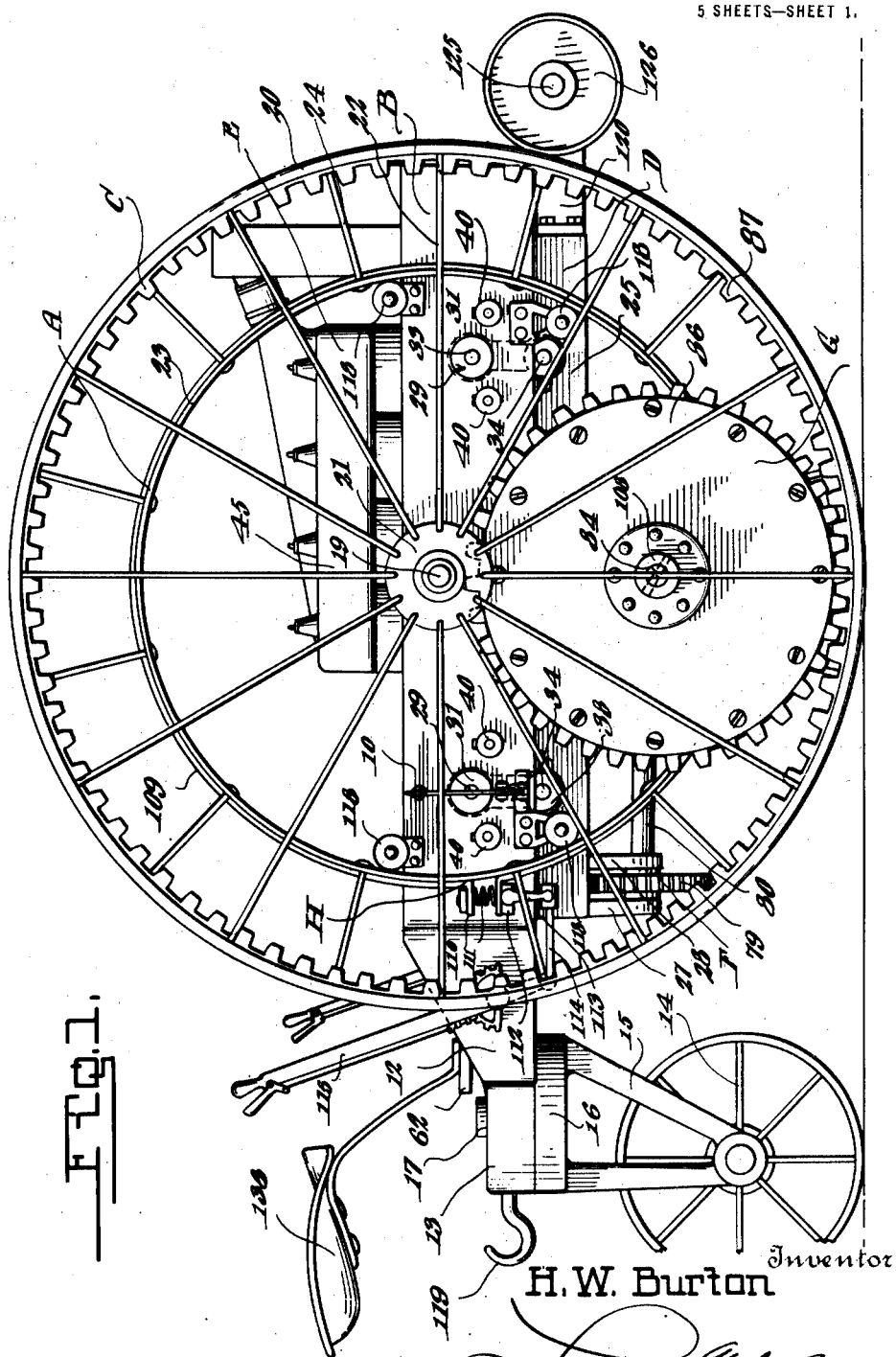

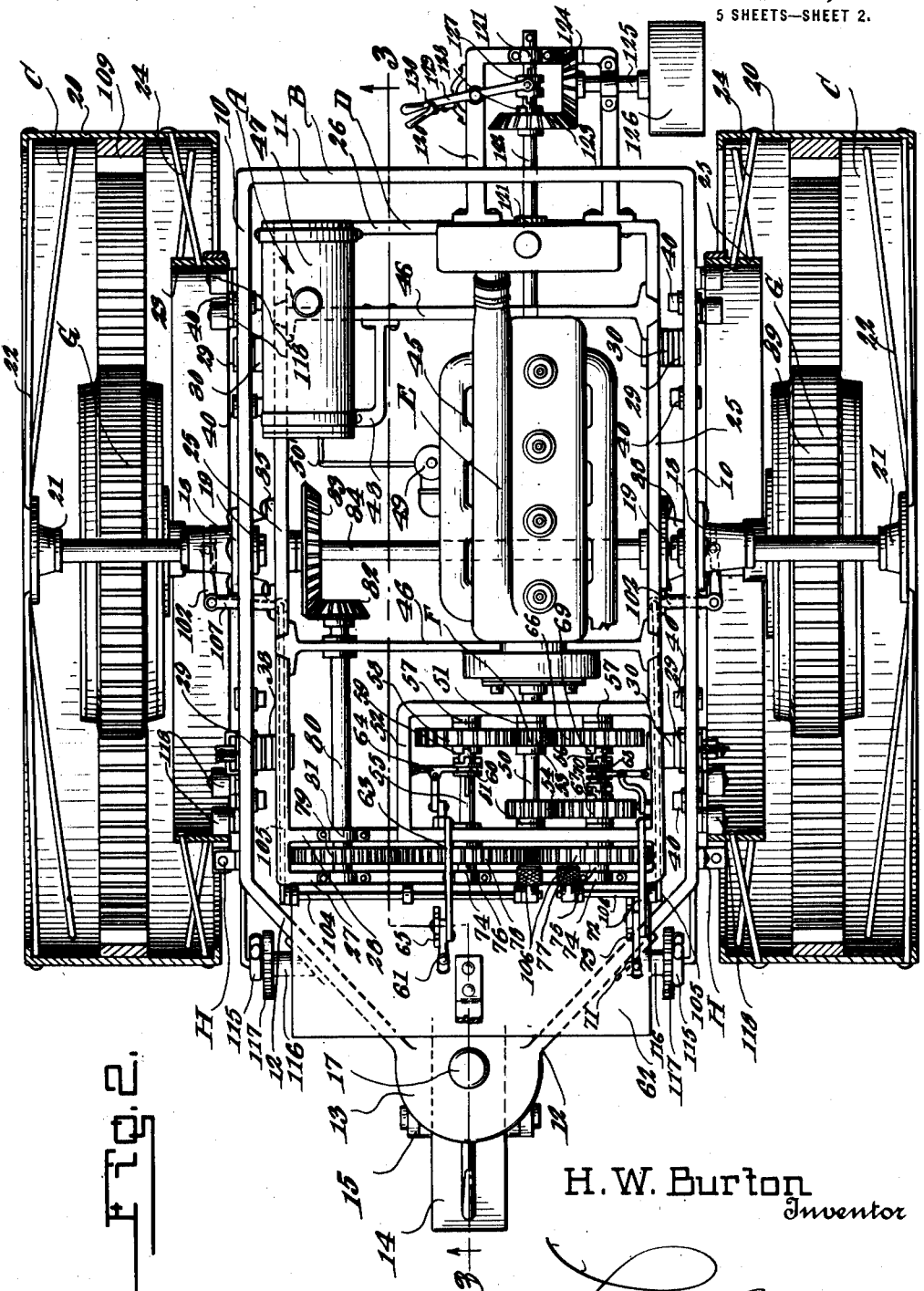

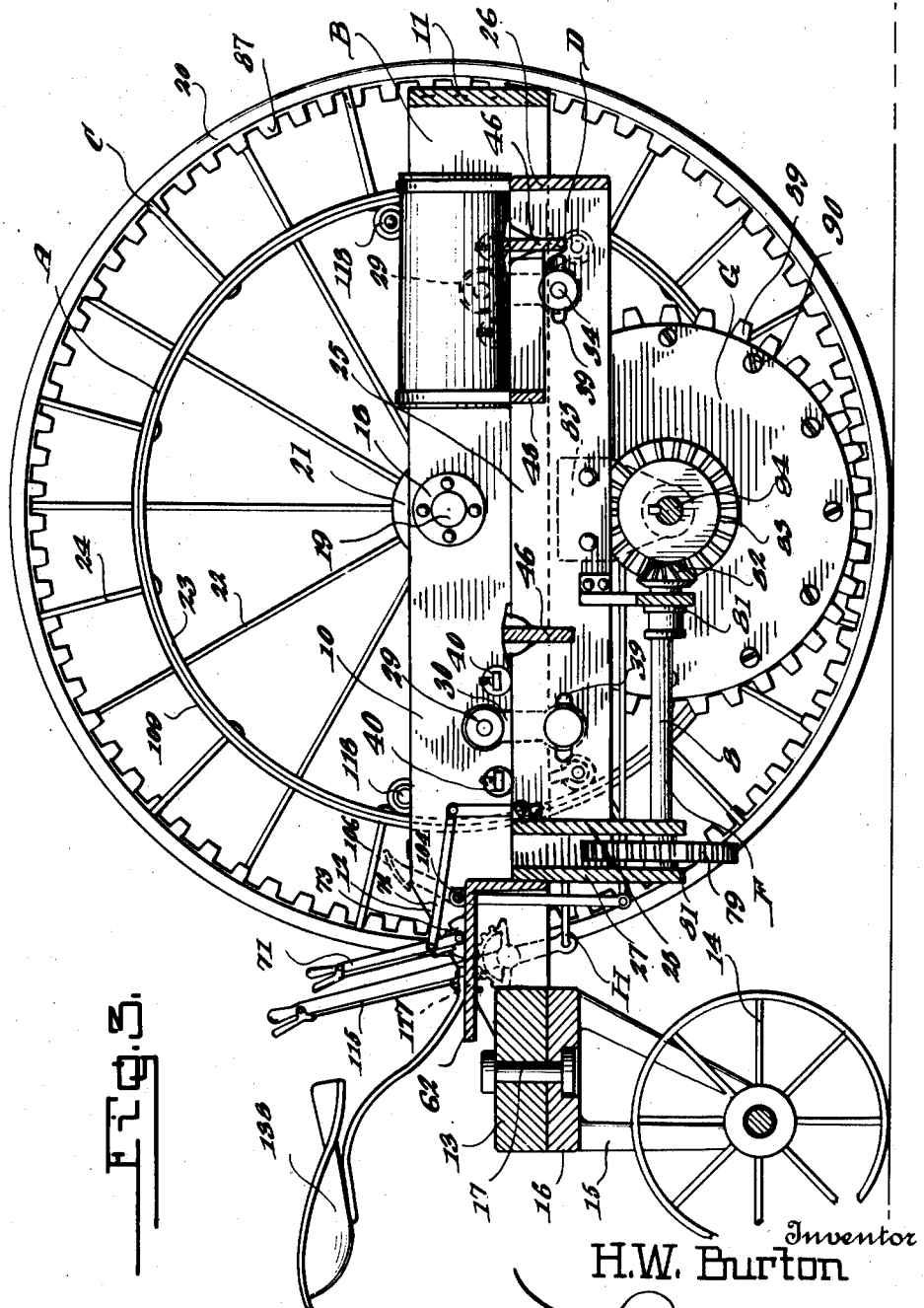

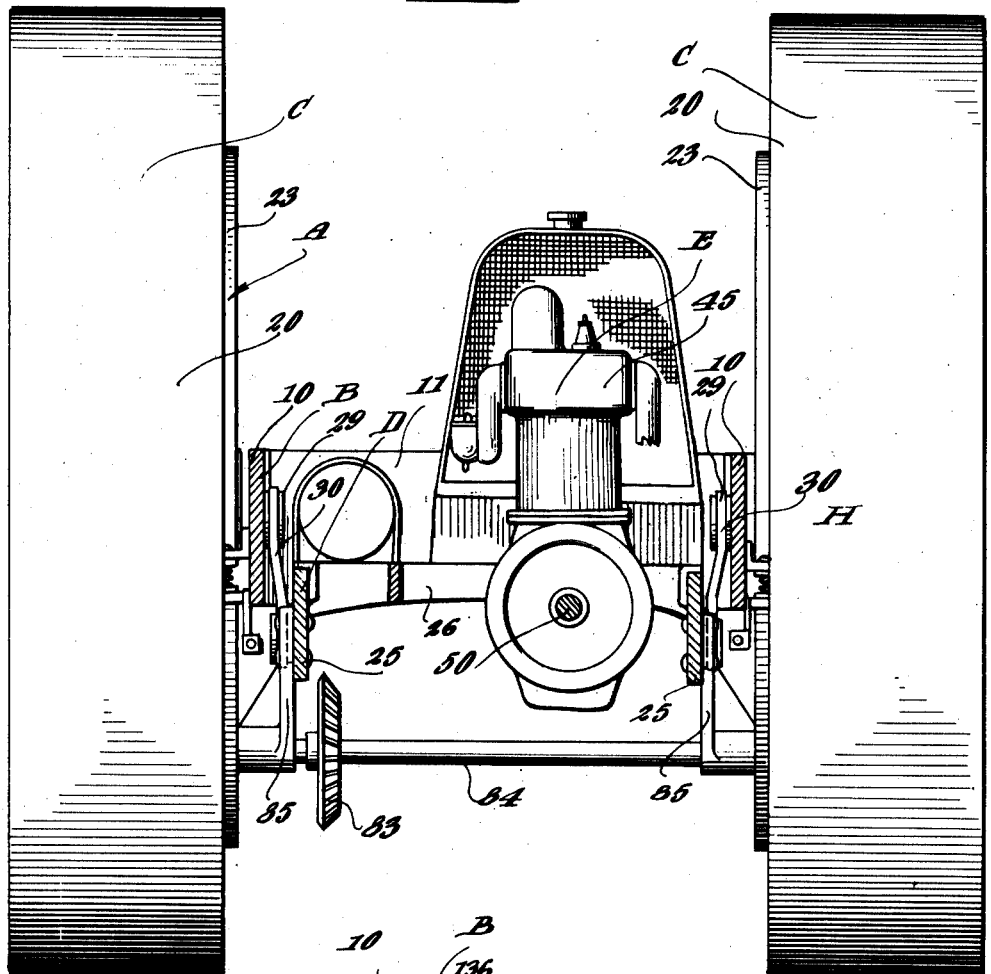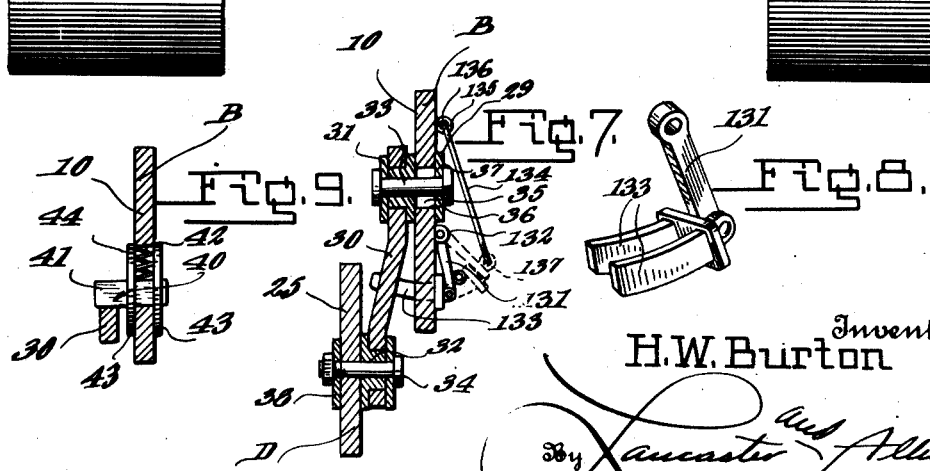

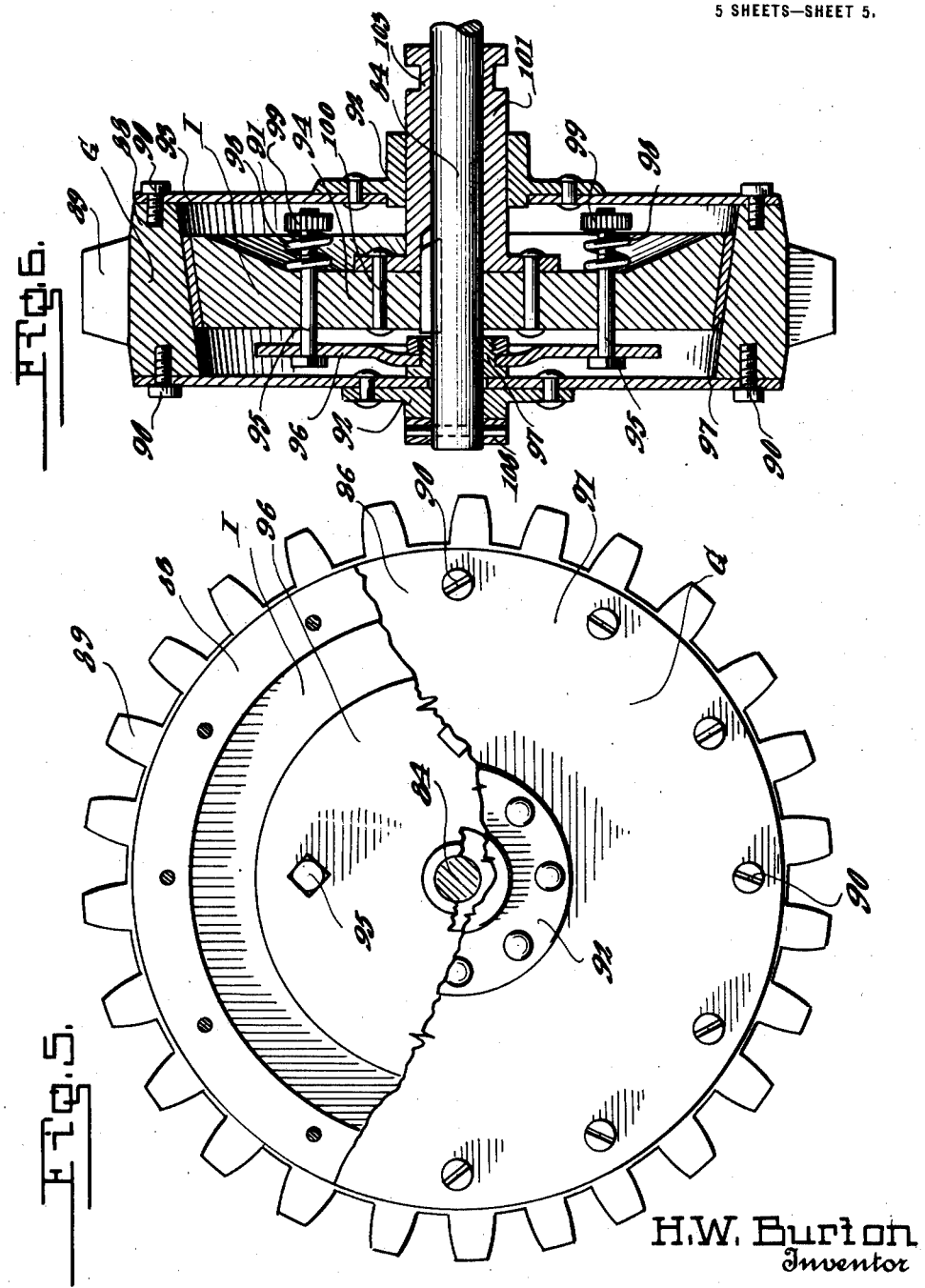

HARRY W. BURTON, OF ENID, OKLAHOMA.

TRACTOR.

1,390,880.

Specification of Letters Patent. Patented Sept. 13, 1921.

Application filed January 26, 1920. Serial No. 354,127.

*To all whom it may concern:*

Be it known that I, HARRY W. BURTON, a citizen of the United States, residing at Enid, in the county of Garfield and State of Oklahoma, have invented certain new and useful Improvements in Tractors, of which the following is a specification.

This invention relates to tractors and the primary object of the invention is to provide an improved tractor in which the weight of the engine, transmission, and supporting frame, is used for aiding in the propulsion of the tractor, in connection with the ordinary engine drive means.

Another object of the invention is to provide an improved tractor in which the power plant and its supporting frame is located within the circumference of the ground or drive wheels, the power plant and its supporting frame being associated with the tractor frame in such a manner as to permit the weight thereof to be utilized in rotating the ground or drive wheels.

A further object of the invention is to provide an improved tractor embodying a main frame and a supplemental swinging frame associated with the main frame, the swinging frame carrying the power plant and the transmission and drive mechanism, and being so arranged in relation to the drive wheels as to permit the weight thereof to aid in the turning of the wheels.

A further object of the invention is to provide an improved tractor embodying a pair of relatively large ground wheels and a main frame connected thereto, the main frame having swingably associated therewith a supplemental frame carrying the motor, transmission, drive mechanism, and the like, which is operatively connected to the ground wheels, the center of gravity of the supplemental frame and associate parts being normally positioned at the vertical axis of the ground wheels, but being so arranged, that when the engine is in operation, as to move to one side of the vertical center of the wheel so as to permit the weight of the frame and associate parts to act on the wheels adjacent to the periphery thereof for turning the same.

A further object of the invention is to provide an improved means for steering the tractor so as to permit the same to turn in a relatively small arc.

A still further object of the invention is to provide an improved tractor having means for stopping the drive and braking the wheels independently of each other so as to permit the easy steering and short turning of the tractor.

A still further object of the invention is to provide an improved tractor of the above character which is durable and efficient in use, one that is simple and easy to manufacture, and one which can be placed upon the market at a reasonable cost.

Other objects of the invention will appear in the following detailed description taken in connection with the improved drawings, in which drawings:

Figure 1 is a side elevation of the improved tractor.

Fig. 2 is a plan view of the tractor showing parts of the same in section.

Fig. 3 is a vertical longitudinal section through the tractor, taken on the line 3—3 of Fig. 2.

Fig. 4 is a transverse section through the tractor.

Fig. 5 is an enlarged fragmentary side elevation of one of the power wheels for engaging the drive or ground wheels.

Fig. 6 is a diametric section through the same.

Fig. 7 is an enlarged fragmentary vertical section through the main and supplemental frame showing the means of hingedly connecting the frames together.

Fig. 8 is a detail perspective view of a locking member for engaging the connecting means of the main and supplemental frames, to prevent movement of the frames in relation to each other, and Fig. 9 is a detail transverse section through the main frame showing one of the spring stops provided for limiting the swinging movement of the connecting means of the main and supplemental frames.

Referring to the drawings in detail, wherein similar reference characters designate corresponding parts throughout the several views, the letter A indicates the improved tractor, which includes the main frame B supported by the ground or bull wheels C, the supplemental frame D carrying the power plant E, the transmission F and the drive gears G the brake mechanism H, and the clutch mechanism I.

The main frame B is of substantially rectangular configuration and includes the spaced parallel side bars 10, which are connected at their forward ends by the transverse cross bar 11. The rear ends of the side bars 10 are provided with inwardly extending inclined end bars 12, which carry the head 13 for the caster wheel 14. The caster wheel 14 is mounted in a fork 15, which carries the head 16, which engages the lower surface of the head 13. The heads 13 and 16 are connected together by a suitable centrally disposed pivot bolt 17. The side bars 10 carry bearings 18, which are located relatively nearer the bar 11 than the head 13 and these bearings 18 rotatably support the stub axles 19 which rotatably support the relatively large bull or ground wheels C.

The ground or bull wheels C include the outer relatively broad rim 20, the hub 21, and the connecting spokes 22. The wheels C carry the inner annular guide tracks 23 which are arranged in concentric spaced relation to the rims 20 and the tracks 23 are connected to the rims by suitable spokes 24. These tracks 23 also form the brake drums for the brake H which will be hereinafter more fully described.

The supplemental frame D is also of open substantially rectangular configuration and is located within the main frame B and extends below the lower edge thereof. The supplemental frame D includes the spaced parallel side bars or beams 25, and the connecting ends or transverse bars 26, and 27. The rear end bar or beam 27 has arranged adjacent thereto in spaced parallel relation, the transversely extending beam or bar 28, and these beams or bars 27 and 28 extend below the lower edge of the forward bar 26 and form a housing for a portion of the speed gears of the transmission F. The supplemental frame D is swingably connected to the main frame B, by depending hangers 29, which are arranged adjacent to the front and rear ends of the frame. Each of the hangers 29 include arms 30 which are slightly offset intermediate their ends so as to allow for the space intermediate the side bars 10 and 25 of the main and supplemental frames B and D. The upper and lower terminals of the arms 30 carry suitable bearings 31 and 32, which rotatably receive the pivot bolts 33 and 34. The upper bearings 31 carry inwardly extending studs or pins 35 which engage in suitable notches 36 formed in the walls of the openings, which receive the supporting bolts 33. Suitable washers 37 and 38 engage the outer surface of the side bars 10 and 25. The side bars 25 are provided with longitudinal slots 39 for the reception of the bolts 34, so as to permit the slight movement of the supplemental frame D forwardly and rearwardly of the main frame B as well as a swinging movement in relation to the main frame. These side bars 10 carry stops 40 which are located on the opposite sides of the arms 30 and serve to limit the swinging movement thereof. Each of the stops 40 includes an arm 41 slidably mounted in a slot 42, formed in the side bars 10. The arms 41 have mounted thereon guide plates 43 which engage the opposite sides of the side bars. Expansion coil springs 44 are confined in the slots 42 between the guide plates 43 and bear against the upper surface of the arms 41 and normally hold the same in their lower positions. When the supplemental frame D is swung either in a forward or rearward direction, the arms 30 engage the arms 41 which limits the upward movement of the arms 30, and the springs 44 cushion the upward movement thereof.

The supplemental frame D carries intermediate its ends the power plant E, which may be of any preferred type of internal combustion engine 45. The engine 45 is mounted on suitable transverse brace bars 46, which also support the gasolene supply tank 47. The tank 47 is also supported by the forward bar 26, and by the auxiliary bracket 48. The supply tank 47 is connected with the carbureter 49 of the engine in any preferred manner as shown at 50'. The crank shaft of the engine is connected with the drive shaft 50 of the transmission F and is mounted in suitable bearings 51 carried by the central portion of the speed gear casing 52 which is secured to one of the side bars 25 and the cross bar 28 of the supplemental frame. The drive shaft 50 has mounted thereon a relatively small gear 53, and a relatively large gear 54, which form a part of the speed changing mechanism. Located at opposite sides of the drive shaft 50 are counter shafts 55 and 56, which are mounted in suitable bearings 57 carried by the frame 52. The counter shaft 55 has freely rotatably mounted thereon a gear 58, which meshes with the gear 53 keyed to the drive shaft 50, and the gear 58 carries a clutch section 59 which is adapted to be engaged by the clutch section 60 feathered on the countershaft. The gear 58 forms the reverse gear for the tractor and the clutch section 60 is shifted by a suitable lever 61, pivotally mounted upon the operator's platform 62, secured to the supplemental frame D. The operating lever 61 is connected by a suitable link and lever connection 63 with the pivoted rider 64 connected to the clutch section 60. The lever 61 is locked in any preferred position by a suitablel pawl and segment mechanism 65. The counter shaft 56 has freely rotatably mounted thereon the two gears 66 and 67, which mesh respectively with the gears 53 and 54 carried by the drive shaft 50. The gears 66 and 67 form a part of the forward speed changing mechanism. The counter shaft 56 has mounted thereon intermediate the gears 66 and 67, the double clutch section 68 which is adapted to move into and out of engagement with the clutch sections 69 and 70 formed on the gears 66 and 67. The double clutch section 68 is moved into or out of engagement with either one of the clutch sections 69 and 70 or to its neutral position by a suitable lever 71, which is connected to the double clutch section by suitable link and lever connections 72. The lever 71 is held in its operative position by a pawl and segment mechanism of the ordinary or any preferred character 73. Between the cross bars 27 and 28 are rotatably mounted in suitable bearings 74, shafts 75 and 76, which have keyed thereto intermeshing gears 77 and 78. The gear 78 in turn meshes with a gear 79 keyed to the shaft 80, which extends longitudinally of the supplemental frame and is mounted in suitable bearings 81. The shaft 80 has keyed to its forward end, the beveled gear 82, which meshes with the relatively large beveled gear 83, which is keyed to the drive axle 84. The guide axle 84 is rotatably mounted in suitable hangers 85 carried by the side bars 25 of the supplemental frame D. The terminals of the drive axle shaft 84 have keyed thereto the relatively large hollow drive pinions 86 which mesh with the interior crown gear 87 carried by the inner surface of the rim 20 of the drive or ground wheels C.

The relatively large drive pinions or gears 86 form the drive means G for the tractor, and each of the same includes an annular rim 88, the outer surface of which carries the gear teeth 89 to form the connection with the ground or drive wheels C. The annular rim 88 has secured thereto by suitable fastening elements 90, the disk shaped side plates 91 carrying hubs 92 for receiving the drive shaft 84. The interior of the annular rim 88 is tapered or cone shaped as indicated at 93, and forms means for coöperating with the clutch mechanism I which will be hereinafter more fully described.

The clutch mechanism I includes a solid disk 94, which is slidably supported on suitable bolts 95 carried by the circular plate 96, which is secured to the shaft 84 by suitable fastening nuts 97. The periphery of the disk 94 has its face tapered or cone shaped for engaging the inner cone shaped face of the ring 88, and the periphery of the disk 94 carries a friction band 97 for firmly gripping the rim 88 when the disk 94 is moved into engagement with the same. The bolts 95 have coiled around the same expansion springs 98, which engage the outer face of the disk and normally tend to move the same out of gripping contact with the rim 88. The outer ends of the expansion coil springs 98 bear against adjustable nuts 99 fitted on the terminals of the bolts 95, and these nuts form means for tensioning the springs 98. The inner face of the disk 94 has bolted or otherwise secured thereto at 100, the sleeve 101, which is slidably mounted in the hub 92, and this sleeve 101 is adapted to be shifted by means of bell cranks 102, which are provided with yoked inner ends for engaging the annular groove 103 formed in the sleeve. The inner terminals of the bell cranks 102 are connected to suitable operating shafts 104 by connecting links 105. The operating shafts 104 have keyed thereto suitable foot pedals 106, which form means for actuating the shafts 104. The bell cranks 102 are pivotally mounted at their angle to suitable brackets 107.

Thus it will be seen that by moving the foot pedals 106, the disks may be moved into frictional contact with the rim 88 and thus rotate the gear wheel 86. It is to be understood that the gear wheels 86 are normally freely rotatably mounted on the shafts 84, and are held from pulling off of the same by suitable caps 108 which are keyed to the terminals of the shaft 84. Either one of the clutches I may be operated independently of the other, so that one of the same may be thrown into engagement with the gear 86 to rotate the same with the drive shaft while the other remains idle. This provides means for steering the tractor and permits the tractor to turn in a relatively narrow space. To also facilitate the turning of the tractor independent braking means H is provided for each one of the drive or ground wheels C, so that the wheel which is not being rotated may be held stationary.

The braking means H for each one of the drive or ground wheels C include annular split brake bands 109, which extend around the annular guide tracks or brake drum 23. The terminals of the brake bands 109 carry outwardly extending ears 110 which are normally held spaced apart by suitable expansion helical springs 111. The ears are carried toward each other against the tension of the spring 111 when it is desired to brake the vehicle by suitable cams 112 which are carried by the upper terminals of the crank arms 113, which in turn are pivotally connected to the hand operated levers 115. The hand operated levers 115 are pivotally mounted on suitable brackets 116 carried by the main frame B and each lever is held in adjusted position by a suitable pawl and segment rack structure 117.

Thus it will be seen by moving either one of the levers 115, either one of the brake bands will be forced into contact with its brake drum or guide track 23. Both levers may be operated simultaneously so as to bring both of the brake bands simultaneously into engagement with the brake drums, when it is desired to stop the motion of the vehicle entirely.

To effectively distribute the weight of the tractor over the entire surface of the ground or drive wheels C and to relieve the weight on the stub axles 19, rollers 118 are mounted on suitable brackets carried by the upper and lower edges of the longitudinal side bars 10 and these rollers engage the inner surface of the guide track or brake drum 23.

In operation of the improved device, the engine 45 is started in the ordinary manner, and one of the levers 61 or 71 is operated so as to connect the transmission mechanism with the engine according to the direction in which the tractor is to be driven. After the tractor has been thrown in gear, the clutches I are thrown into engagement with the drive pinions by moving the pedals 106. This will set the gears 86 into motion, and the same will climb up the ring gears 87 until the hanger arms 30 come into engagement with the stops 40, at which time the weight of the supplemental frame, motor and transmission in connection with the drive means will rotate the ground wheels and move the tractor. When it is desired to turn the vehicle, one of the brake levers on one side of the vehicle is operated, and the foot pedals controlling the clutch on the same side is also operated so as to move the clutch out of operative position with the gear G which will turn the tractor in a very small space. The rear end of the tractor has attached thereto a draw head 119 so as to permit farm implements to be attached thereto.

To permit the tractor to be used for stationary work, an auxiliary frame 120 is secured to the cross beam 26 of the supplemental frame D, and the auxiliary frame projects forwardly therefrom, and carries suitable bearings 121 for the reception of the extended end 122 of the crank shaft of the engine. The forward cross bar 11 of the main frame is provided with notches for the reception of the auxiliary frame, so as to permit movement of the auxiliary frame with the supplemental frame in relation to the main frame. The extended portion 122 of the shaft has rotatably mounted thereon the beveled gear 123 which is adapted to mesh with a beveled gear 124 keyed to the counter shaft 125, which has keyed or otherwise secured thereto a suitable drive pulley 126, which forms means whereby the engine may be connected to stationary machinery such as cream separators, pumps and the like. When it is desired to use the pulley, the sliding clutch section 127, which is feathered to the shaft 122, is moved into engagement with the clutch section 128, which is formed on the beveled gear 123, by a suitable lever 129, which can be locked into position desired by a suitable pawl and segmental rack mechanism 130.

When the pulley 126 is to be used, the clutch sections 60 and 68 are moved out of engagement with the speed gears so as not to operate the drive axle 84 and to further hold the supplemental and main frames D and B against movement in relation to each other, locking levers 131 are provided. The locking levers 131 are pivotally mounted to suitable ears 132 carried by the side bars 10 of the main frame B and the lower end of the levers 131 carry inwardly extending spaced arms 133, which are adapted to extend through suitable slots formed in the side bar on opposite sides of the hanger arms 30. The lever 131 is adapted to be moved inwardly so as to position the arms 133 on opposite sides of the hanger arm 30, which absolutely prevents swinging movement thereof. When the locking levers are not in use, the same is held out of operative position by suitable latches 134, which, as shown, consist of hooks 135 pivotally carried by eyes 136. The lower ends of the hooks 135 are adapted to engage in suitable eyes 137 carried by the lower end of the levers 131. It is to be understood that the arms 135 can be operated from the driver's platform by any suitable operating mechanism if so desired. The driver's platform 62 has bolted or otherwise secured thereto any preferred type of seat 138.

From the foregoing description it can be seen that an exceedingly simple and efficient tractor has been provided, in which the weight of the engine and frame is utilized for propelling the tractor as well as the drive shaft mechanism.

Changes in details may be made without departing from the spirit or scope of the claims, but—

I claim:

1. In a tractor, a main frame, a supplemental frame connected to the main frame for swinging movement, ground wheels carried by the main frame, internal ring gears carried by the ground wheels, a guide track carried by the ground wheels and arranged in concentric relation to the ring gears, guide rollers carried by the supplemental frame, and arranged to engage the guide tracks, a prime mover carried by the supplemental frame, a drive axle carried by the supplemental frame, means operatively connecting the drive axle with the prime mover, pinions rotatably mounted on the axle and arranged to mesh with the ring gears, sliding clutches mounted on the axle and arranged to move into and out of engagement with the pinions, means for independently operating the clutches, and brake bands arranged to engage said guide tracks.

2. In a tractor, a main frame, a supplemental frame arranged within the main frame and connected thereto for swinging movement, ground wheels carried by the main frame intermediate its ends, a prime mover carried by the supplemental frame, a drive axle carried by the central portion of the supplemental frame, means operatively connecting the prime mover with the drive axle, speed changing gears interposed in said means, hollow drive pinions rotatably mounted on the drive axle and arranged to mesh with the ground wheels, the inner surface of the drive pinions having a cone face, clutch sections arranged within the drive pinions, means normally holding the clutch sections out of engagement with the cone face, and means for moving the clutch sections into engagement with the cone face.

3. In a tractor, a main frame, a supplemental frame connected to the main frame for swinging movement, ground wheels carried by the main frame, a prime mover carried by the supplemental frame, a drive axle carried by the supplemental frame, means operatively connecting the prime mover with the drive axle, ring gears carried by the ground wheels, hollow drive pinions rotatably mounted on the axle and meshing with the ring gears, a disk carried by the ring gears and arranged in the interior thereof, a sliding section arranged in the ring gears, bolts carried by the disk and slidably supporting the clutch section, spring means carried by the bolts and arranged to normally hold the clutch section out of engagement with the drive pinions, a sleeve carried by the clutch section and threaded to said drive axle arranged for sliding movement of the drive axle and means for operating said sleeve.

4. In a tractor, a main frame, a supplemental frame connected to the main frame for swinging movement, relatively large ground wheels carried by the main frame intermediate its ends, a prime mover carried by the supplemental frame, a drive axle carried by the supplemental frame, hollow drive pinions rotably mounted on the axle, ring gears carried by the ground wheels and meshing with the drive pinions, a disk carried by each of the drive pinions and arranged in the interior of the same, outwardly extending brakes carried by the disk, a clutch section slidably mounted on the bolt, the clutch section having a cone face, the inner face of the ring gear having a cone face, expansion springs arranged on the bolt, arranged to normally hold the clutch section out of engagement with the cone face of the drive pinion, adjustable nuts carried by the bolts arranged to adjust the tension of the springs, and means for operating said clutch sections.

5. In a tractor, a main frame, a supplemental frame arranged in the main frame and connected thereto for swinging movement, relatively large ground wheels carried by the main frames and arranged intermediate its ends, ring gears carried by the ground wheels adjacent to the rim thereof, a prime mover carried by the supplemental frame, a drive axle carried by the supplemental frame, drive pinions rotatably mounted on the drive axle, means for operatively connecting the prime mover to the drive axle, the drive pinions meshing with the ring gears, a driver's platform carried by the supplemental frame, operating levers mounted on said platform for connecting the drive pinions with the drive axles, an annular track carried by the ground wheels and arranged in concentric relation with the ring gears, side rollers carried by the main frame for engaging the inner surface of the track, brake bands arranged to engage the outer surface of said track, and operating levers arranged on the driver's platform for operating the brake bands.

6. In a tractor, a substantially rectangular main frame, relatively large ground wheels rotatably carried by the main frame intermediate its ends, a caster wheel carried by the main frame at the rear end thereof, a supplemental frame arranged within the main frame, hanger arms pivotally connected to the main frame and supplemental frame, a prime mover carried by the supplemental frame, a drive axle carried by the supplemental frame, means operatively connecting the prime mover with the drive axle, drive pinions carried by the axle and arranged to engage the ground wheels, and resilient means disposed in the path of the hanger arms for limiting the swinging movement thereof.

7. In a tractor, a substantially rectangular main frame, stub axles carried by the main frame intermediate its ends, ground wheels rotatably mounted on the stub axles, ring gears carried by the rim of the ground wheel, a supplemental frame arranged within the main frame, hanger arms pivotally connected to the main and supplemental frames, a prime mover carried by the supplemental frame intermediate its ends, a drive axle carried by the supplemental frame and arranged in direct vertical alinement with the stub axles, and drive pinions carried by the drive axle and arranged to mesh with the ring gears.

8. In a tractor, a substantially rectangular main frame including side bars, the rear ends of the side bars being converged, a head carried by the converged ends of the side bars, a caster wheel carried by said head, stub axles carried by the side bars, and arranged intermediate the terminals of the side bars, relatively large ground wheels rotatably mounted on the stub axles, interior ring gears carried by the rim of the ground wheels, a substantially rectangular supplemental frame arranged within the main frame, and arranged to normally lie below the same, hanger arms slidably connected to the main and supplemental frames, a drive axle carried by the supplemental frame, and arranged to normally lie in direct vertical alinement with the stub axles, a prime mover carried by the supplemental frame, means operatively connecting the prime mover with the drive axle, drive pinions rotatably mounted on the drive axle and meshing with the ring gears, and means for operatively connecting the pinions with the drive axle.

9. In a tractor, a main frame including a pair of spaced side bars, ground wheels carried by the side bars, a supplemental frame arranged within the main frame and including side bars, hanger arms pivotally connected to the side bars of the main frame, and pivotally and slidably connected to the side bars of the supplemental frame, resilient stubs carried by the side bars of the main frame and arranged on opposite sides of the hanger arms, a prime mover, and means operatively connecting the prime mover with the ground wheel.

10. In a tractor, a main frame, a supplemental frame, hanger arms pivotally carried by the main frame, means pivotally and slidably connecting the hanger arms to the supplemental frame, and means carried by the main frame and arranged to be brought into and out of engagement with the hanger arms to prevent movement thereof.

11. In a tractor, a main frame, a supplemental frame, ground wheels carried by the main frame, hanger arms pivotally carried by the main frame, and pivotally and slidably connected to the supplemental frame, pivoted levers carried by the main frame and arranged to project therethrough, stub terminals carried by the pivoted levers and arranged to engage on opposite sides of the hanger arms to prevent movement thereof, and means for holding the lever out of engagement with the arms, a prime mover carried by the supplemental frame, and means for operatively connecting the prime mover with the ground wheels.

12. In a tractor, a main frame, a supplemental frame connected thereto for swinging movement, ground wheels carried by the main frame, a prime mover carried by the supplemental frame, means operatively connecting the prime mover with the ground wheel, a pulley carried by the frame, means for operatively connecting the pulley with the prime mover, and means for preventing swinging movement between the frames.

HARRY W. BURTON.